United States Patent

Silder, Jr. et al.

(10) Patent No.: US 6,629,023 B1
(45) Date of Patent: Sep. 30, 2003

(54) METHOD FOR PERFORMING AN AUTOMATED CATEGORY A APPROACH MANEUVER

(75) Inventors: Stephen H. Silder, Jr., Stuart, FL (US); Charles W. Evans, Norfolk, CT (US); Christopher A. Thornberg, Newton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/135,995

(22) Filed: Apr. 30, 2002

(51) Int. Cl.$^7$ ............................................. G06F 19/00
(52) U.S. Cl. .......................... 701/16; 701/15; 701/17; 340/945; 340/947; 340/948; 244/114 R; 244/180; 244/197
(58) Field of Search .............................. 701/3, 13, 14, 701/15, 16, 17, 18, 213, 223; 244/114 R, 180, 197; 340/945, 947, 948, 953

(56) References Cited

U.S. PATENT DOCUMENTS

| | | | | |
|---|---|---|---|---|
| 3,578,269 A | * | 5/1971 | Kramer et al. ............... | 244/187 |
| 4,414,532 A | * | 11/1983 | Kaul ............................ | 340/953 |
| 5,020,747 A | * | 6/1991 | Orgun et al. ................ | 244/187 |
| 6,438,469 B1 | * | 8/2002 | Dwyer et al. ................. | 701/16 |

* cited by examiner

Primary Examiner—Gertrude Arthur
(74) Attorney, Agent, or Firm—Bachman & LaPointe, P.C.

(57) ABSTRACT

A method for automating a landing maneuver for an aircraft, comprising the steps of generating an approach profile comprising an initial approach fix (IAF), a flight path, a landing decision point, a balked landing route, a pre-landing point, and a landing point, engaging an automated approach system to access the approach profile, receiving periodic position data of the aircraft, comparing the position data to the approach profile to compute a plurality of deviations each time the position data is received, outputting the plurality of deviations to a display, converting the plurality of deviations into a plurality of control commands, and maneuvering the aircraft in response to the control commands along the flight path.

27 Claims, 2 Drawing Sheets

METHOD FOR PERFORMING AN AUTOMATED CATEGORY A APPROACH MANEUVER

BACKGROUND OF THE INVENTION

1. Field of the Invention

The present invention relates to a system for enabling an automated Category A approach and landing maneuver as well as a method of using the system to perform such a maneuver. More specifically, the present invention relates.

2. Description of Related Art

Multi-engine helicopters operating under Federal Aviation Regulation (FAR) Sections 29.77, 29.79, 29.81 and 29.85 have requirements that define Landing Decision Points (LDP), Landings, Landing Distances and Balked Landings which must be met prior to certifying an aircraft for Category A operations.

Flying a Category A approach and landing is a three dimensional problem requiring a pilot to fly an angle of glide slope in accord with specific airspeed gates and deceleration requirements, define a landing decision point LDP, and land on a point in space, typically a raised heliport.

At present, such a maneuver is performed by establishing a sight picture at a specific airspeed and altitude, flying an angle of glide slope with the specific airspeed gates and deceleration requirements, defining an LDP, arriving at the LDP at a predefined altitude and airspeed and landing on the raised heliport.

If an engine is lost during the approach, the pilot needs to recognize the failure and react by either performing a balked landing (go around) or continuing the landing (required if failure occurs beyond the LDP).

On current helicopters, the pilot establishes the sight picture (angle of glide slope) and starts the deceleration. In addition, he determines where in space the LDP is located (airspeed and altitude) and, upon arriving at the LDP, decides whether to continue the approach to landing or conduct a balked landing. In the case of an engine failure, if the aircraft is before or at the LDP the pilot would decide to continue or to perform a balked landing. If the aircraft is below the LDP the pilot must continue to landing.

Under optimal conditions, the requirements and demands placed upon a pilot performing such an approach and landing are substantial. In the event of an engine failure, the split second requirements of a pilots decision making process can increase the difficulty of such an approach. It would be preferable to offload as many of the requirements of an approach to a system external to the pilot which would allow the pilot to focus his attention on a reduced set of mission critical data. The advent of coupled flight controls/directors and Global Positioning Systems (GPS) make possible the real time acquisition of data important to landing an aircraft as well as the ability to act upon such data in an automated fashion.

What it needed therefore is an automated system and method for utilizing such a system to perform Category A approach and landing maneuvers. Such a system and method would ideally allow the pilot to monitor an automated approach intervening only as his expertise is required.

SUMMARY OF THE INVENTION

Accordingly, it is an object of the present invention to provide a method whereby an aircraft may conduct a landing and approach in an automated manner.

It is yet another object of the present invention to provide a system for enabling the automated performance of a landing and approach.

In accordance with the present invention a method for automating a landing maneuver for an aircraft, comprises the steps of generating a Category A approach profile comprising an initial approach fix (IAF), a flight path, a landing decision point, a balked landing route, a pre-landing point, and a landing point, engaging an automated approach system to access the approach profile, activating a deadman switch to output a pilot monitor status, receiving periodic position data of the aircraft, comparing the position data to the approach profile to compute a plurality of deviations each time the position data is received, outputting the plurality of deviations to a display, converting the plurality of deviations into a plurality of control commands, and maneuvering the aircraft in response to the control commands along the flight path.

In accordance with the present invention a system for enabling a landing maneuver comprises a positioning system for determining a position of an aircraft and outputting the location as position data, a flight management system (FMS) capable of accessing or computing an approach profile, receiving as input the position data, comparing the position data to the approach profile to compute deviation data and outputting the deviation data, a deadman switch capable of outputting a status signal, an automatic flight control system/flight director (AFCS/FD) receiving as input the status signal and the deviation data and outputting control commands, at least one trim servo for receving the control commands and responding so as to alter the speed and direction of the aircraft, and a pilot display receiving as input the deviation data.

In accordance with the present invention a method for simulating an automated a landing maneuver for an aircraft, comprises the steps of generating an approach profile comprising an initial approach fix (IAF), a flight path, a landing decision point, a pre-landing point, and a landing point, engaging an automated approach system to access the approach profile, receiving periodic simulated position data of the aircraft, comparing the position data to the approach profile to compute a plurality of deviations each time the position data is received, outputting the plurality of deviations to a display, converting the plurality of deviations into a plurality of control commands, and configuring a display of a flight simulator in response to the control commands.

DETAILED DESCRIPTION OF THE PREFERRED EMBODIMENT(S)

Figure 1:
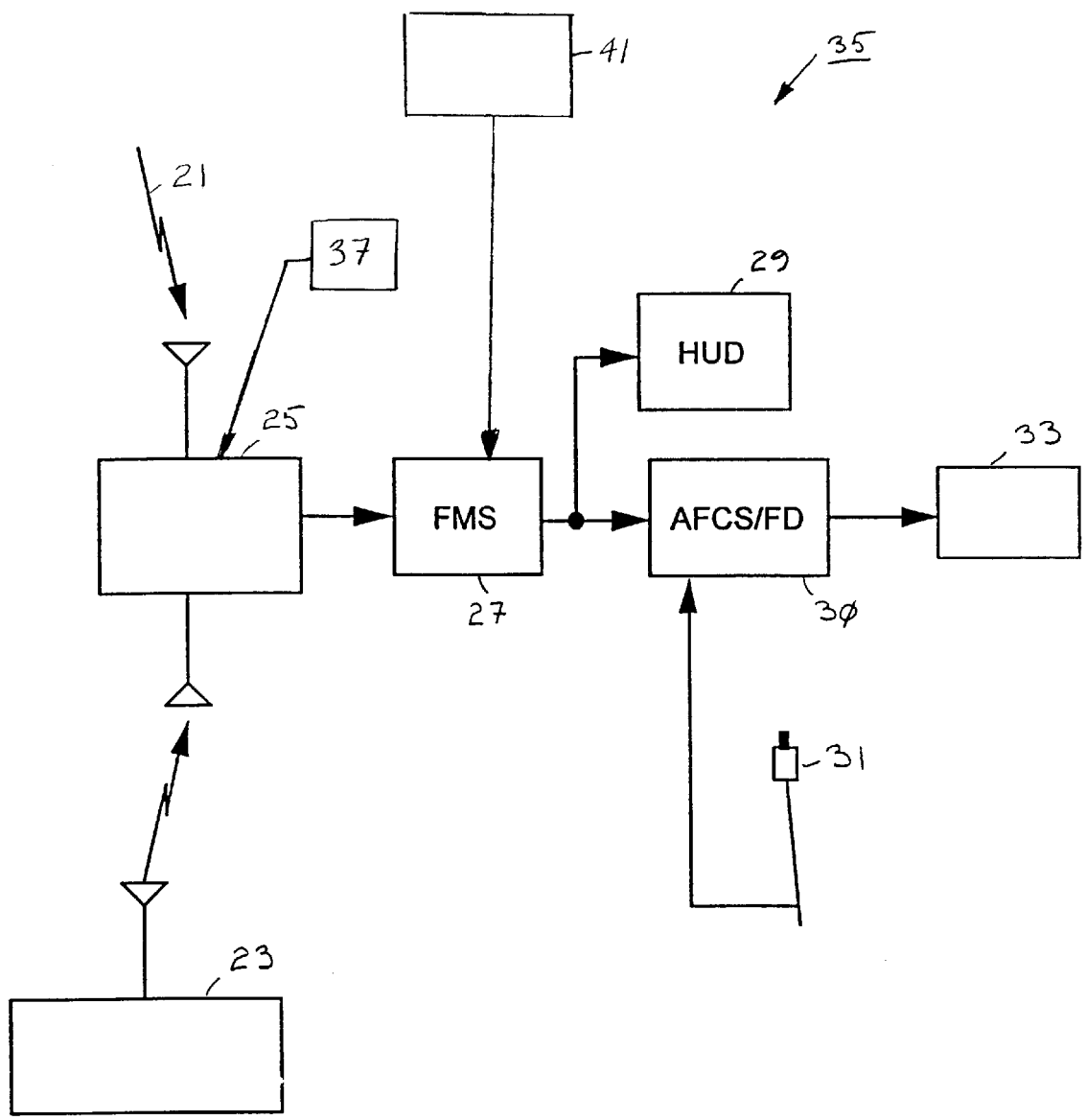
FIG. 1   A block diagram of the automated approach system of the present invention.

With reference to FIG. 1 there is illustrated a block diagram of the automated approach system 35 of the present invention. Approach system 35 comprises a positioning system 25, the flight management system (FMS) 27, the automatic flight control system/flight director (AFCS/FD) 30, a pilot display 29, a deadman switch 31, and trim servos 33. A functional description of each component of the system follows.

The FMS is responsible for computing the Category A Approach profile. The approach profile is a description in three dimensions of the path to be followed by an aircraft employing the automated approach system 35 of the present invention. The composition of the approach profile is discussed more fully below. In addition to computing or otherwise accessing an approach profile, the FMS 27 provides steering and velocity commands to the AFCS/FD 30 to ensure that the aircraft is following the approach profile.

FMS 27 is a preprogrammed computer capable of receiving input, performing computations upon the input to produce results, and outputting such results. FMS 27 receives as input from positioning system 25 data specifying the location of the aircraft in three dimensions. Comparing the position data to the approach profile, the FMS 27 ensures that the aircraft is appropriately positioned and at the correct speed prior to entering the approach, computes and provides deviation commands to the AFCS/FD 30 during the approach, and determines when the aircraft has reached a landing decision point (LDP).

The FMS 27 is capable of performing these functions because it has access to, as part of the approach profile, the exact three dimensional coordinates of the landing area, it has access to the three dimensional profile that intercepts the landing area, and it receives very accurate three dimensional aircraft position and velocity data from the positioning system 25.

The FMS generates the Category A Approach profile based in part upon the landing area positional data which can be either entered manually by a pilot or would be more likely stored in a database within the FMS 27. In addition, based on wind information, the pilot selects the desired inbound approach course to the landing area and inputs the approach course into the FMS 27 via approach course module 41. In one embodiment, approach course module 41 is a user interface through which the pilot enters the approach course. Approach course module 41 has a means for communicating with FMS 27 including, but not limited to, radio or hardwired connectivity. With these inputs the FMS 27 can automatically generate a 3-dimensional Category A Approach profile for a selected landing area, including a deceleration profile to ensure that the aircraft arrives at a zero velocity ground speed hover in close proximity to and over the landing area. This approach profile generation function would typically be performed while the aircraft is still en route to the landing area.

The positioning system 25 operates to determine the position of the aircraft in three dimensions and to output such position information to the FMS 27. In a preferred embodiment, positioning system 25 receives information via satellite 21, such as from the global positioning system (GPS). In another embodiment, positioning system 25 receives data from a ground station 23 from which can be computed the position of the craft. In addition to such systems, positioning system 25 may receive input from an inertial positioning unit 37 located aboard the aircraft. In a preferred embodiment, positioning system 25 receives from data from more than one of the systems including, but not limited to, satellite 21, ground station 23, and inertial positioning unit 37. While described with reference to satellite 21, ground stations 23, and internal positioning unit 37, the present invention is broadly drawn to encompass any and all means by which positioning system 25 can ascertain the position of the aircraft in three dimensions.

Comparing the actual position of the aircraft outputted by the positioning system 25 to the computed approach profile, the FMS 27 computes and provides to the AFCS/FD 30 precise profile deviation information. Deviation information may comprise the lateral deviation, vertical deviation, and speed deviations from the approach profile. In addition, the FMS 27 provides the AFCS/FD 30 with other necessary data such as the distance to the landing area and whether the aircraft has passed through an LDP. The AFCS/FD 30 is a preprogrammed computing device capable of receiving data, performing calculations upon such data, and outputting results. After receiving as input the deviation information outputted by the FMS 27, the AFCS/FD 30 utilizes the profile deviation data to compute the appropriate aircraft response required to maintain the aircraft on the profile during the approach.

The responses thus computed by the AFCS/FD 30 are outputted to the trim servos 33. Trim servos 33 form the flight control surfaces of the aircraft. Upon receiving as input the responses outputted by the AFCS/FD 30, the trim servos 33 operate as instructed to alter the speed and direction of the aircraft in accordance with the approach profile.

In an alternative embodiment, simulated position data may be repeatedly computed external to the automated approach system 35 and inputted into the FMS 27 resulting in responses computed by the AFCS/FD 30 which can then be outputted to a flight simulator. The simulated position data is repeatedly computed and updated to reflect the actual position of the aircraft if such an aircraft were operated in response to the output of the AFCS/FD 30. As used herein, "flight simulator" refers to any configuration of hardware or software capable of working alone or in concert to create a sensory experience which closely resembles the experience of flying in an aircraft. In such an embodiment, the flight simulator uses the computed responses as inputs to compute an output including, but not limited to, image and audio data. The image and audio data may then be displayed to a pilot to produce an experience similar to that which is experienced during the normal functioning of the automated approach system 35. In accordance with such an embodiment, the aircraft is a virtual aircraft maneuvered in response to the computed responses in a virtual manner.

In addition, the information outputted by FMS 27 serves as the input to pilot display 29. In a preferred embodiment, pilot display 29 is a heads up display (HUD). Pilot display 29 allows the pilot to monitor the progress of the automated approach. In addition to visually displaying the output data of FMS 27, pilot display 29 may also combine auditory and other sensory queues to aid the pilot in his interpretation of the data.

Deadman switch 31 outputs a status signal which serves as an input to the AFCS/FD 30. When activated by the pilot, deadman switch 31 outputs a status signal indicating that the pilot is monitoring the automated approach. Should the pilot deactivate deadman switch 31, AFCS/FD 30 senses the change in the status signal outputted by deadman switch 31 and acts accordingly to alter the functionality of the automated approach system 35. The details of how the deadman switch 31 status signal affects the automated approach is discussed more fully below.

Figure 2:
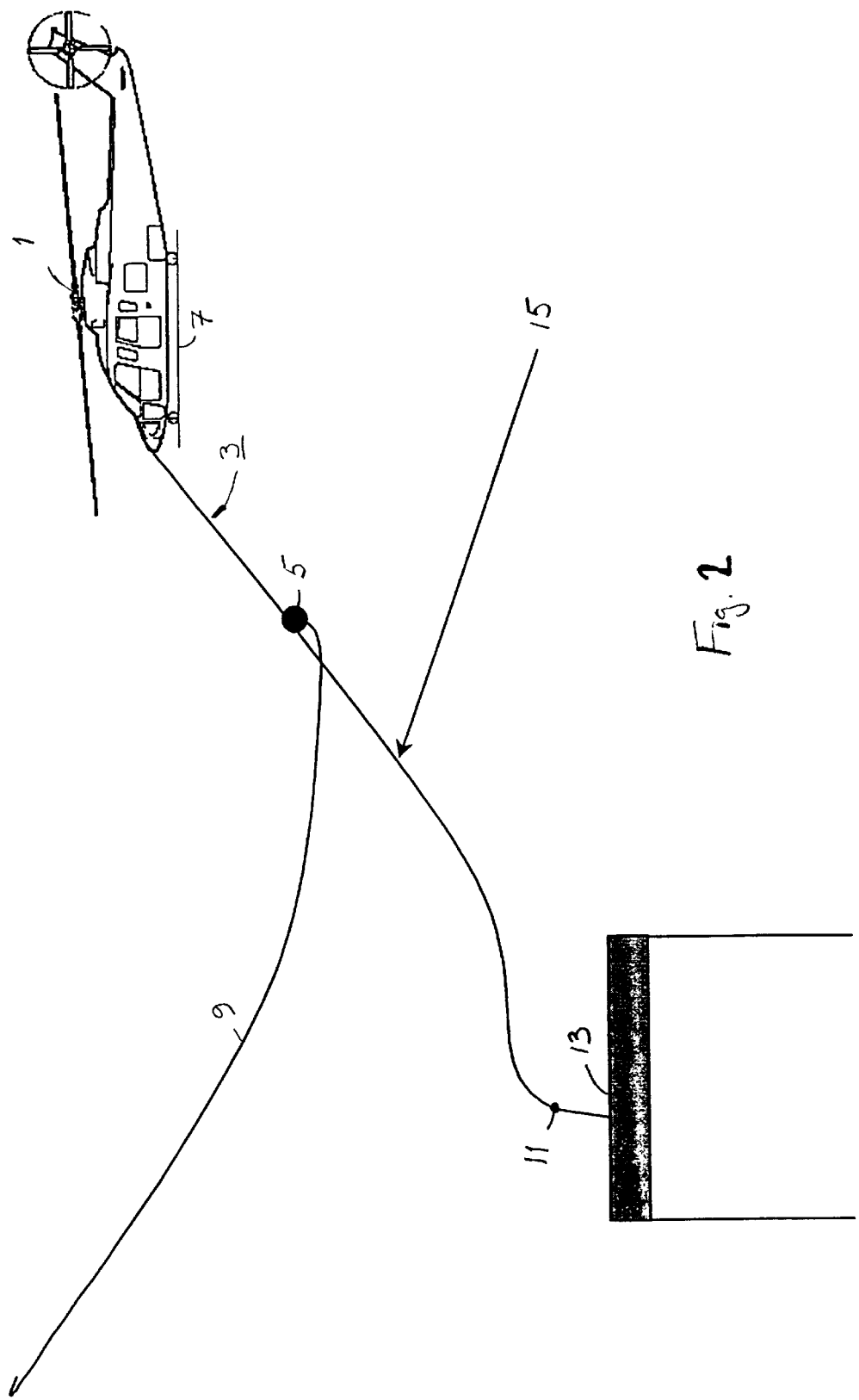
FIG. 2   A diagram of an approach profile of the present invention.

Having described the components which comprise automated approach system 35, reference is made to FIG. 2 wherein there is illustrated an approach profile 3. An aircraft 1 is pictured located at an initial approach fix (IAF) 7. The IAF 7 is the point in three dimensional space from whence commences the computed approach profile. In a preferred embodiment as illustrated, the aircraft 1 is a rotary blade aircraft, preferably a helicopter.

Approach profile 3 extends generally along flight path 15 from the IAF 7, through an LDP 5, to a pre-landing point 11 in close proximity to landing point 13. Landing point 13 may be any point on a surface upon which an aircraft 1 can land. In a preferred embodiment, landing point 13 is coincident with a raised heliport or landing platform tailored to provide a surface upon which a helicopter can land. Balked landing route 9 illustrates the path that an aircraft follows under the automated approach system 35 of the present invention in the event of a balked landing. The point at which balked landing route 9 deviates from the otherwise continuous extension of approach profile 3 along flight path 15 is located between the IAF 7 and the LDP 5. The conditions which may give rise to an aircraft 1 following balked landing approach route 9 are discussed more fully below.

The operation of the automated approach system of the present invention from its activation through to landing is herein described in detail. First, the location of landing point 13 as well as a preferred inbound course to landing point 13 is entered into the FMS 27. In a preferred embodiment, the inbound course data is inputted by the pilot, via approach course module 41, and is determined based on the speed and direction of the wind at the landing point. In another embodiment, the inbound course data is automatically computed by approach course module 41 based upon data indicative of wind characteristics present at landing point 13 and communicated to approach course module 41. The inbound course data is subsequently transmitted to the FMS 27.

Using the inbound course data, the FMS 27 generates a Category A approach profile 3 based on the landing point 13 positional data which can be either entered manually by a pilot or would be more likely stored in a database within the FMS 27. The generated approach profile 3 is a complete description of the path through which the aircraft 1 must pass to complete the automated approach. In addition to the path to be followed, approach profile 3 includes deceleration and acceleration requirements for the aircraft 1 that must be realized to ensure that the aircraft 1 arrives at a zero velocity ground speed hover at pre-landing point 11 located over the landing point 13. This approach profile 3 generation function is typically performed by the FMS 27 while the aircraft is still enroute to the landing area. In one embodiment, the FMS can dynamically update the approach profile in response to receiving as input updated wind and inbound course data. In such an instance, upon receiving updated inbound course data via inbound course module 41, FMS 27 automatically computes a new approach profile reflecting the new wind conditions and proceeds to compute and output deviations based upon the newly computed approach profile.

With the approach profile established, the aircraft is maneuvered to the IAF whereupon the automated approach system 35 is engaged. In a preferred embodiment the pilot, through the FMS, generates an IAF path, defining the route to the IAF 7 of the approach profile 3, and engages the automated approach system 35 by engaging the navigational coupling mode of the AFCS/FD 30. As a result, FMS 27 subsequently monitors the position of the aircraft 1 based on input from the positioning system 25 and provides steering commands, altitude commands and speed commands to the AFCS/FD 30 to ensure the aircraft follows the defined flight plan and is properly positioned and at the correct speed when it starts the approach to the landing area at the IAF.

Prior to reaching the IAF, the pilot depresses and holds deadman switch 31 to indicate to the AFCS/FD 30 that he is actively monitoring the progress of the approach and can readily intervene in the event of a malfunction. Upon reaching the IAF, the FMS 27 provides the AFCS/FD 30 with very precise profile deviation information, i.e. lateral deviation, vertical deviation, speed errors, as well as other necessary data such as the distance to the landing area and whether the aircraft has passed through the LDP 5.

The AFCS/FD 30 uses the profile deviation data to determine the appropriate aircraft response required to maintain the aircraft on the profile during this critical portion of the approach. After the AFCS/FD 30 has successfully completed the approach profile 3 through pre-landing point 11, the aircraft attains a zero velocity hover directly over the landing point 13 at pre-landing point 11. At this point the AFCS/FD 30 automatically transitions to a position hover hold mode over the landing area and decreases the collective to land the aircraft.

For increased situational awareness during the automated approach, pilot display 29 transmits the output of the FMS 27 to the pilot or pilots of the aircraft 1. The pilot display 29 allows the pilot to maintain visual contact with the landing area while monitoring the progress of the automated approach. The display methodology for the pilot display 29 may take any form sufficient to transmit the output of the FMS 27 to the pilot.

During the automated approach, the AFCS/FD 30 also has the responsibility to monitor the operation of the aircraft engines, determine the occurrence of a one engine inoperable (OEI) condition and automatically initiate a balked approach or continue with the landing. If the OEI condition occurs prior to the aircraft 1 reaching LDP 5, the AFCS/FD 30 will continue along the approach profile under control of the automated approach system 35 unless commanded to initiate a balked landing by the pilot. Such a command may be transmitted to the AFCS/FD 30 through any means capable of interfacing with the AFCS/FD 30 whereupon AFCS/FD 30 proceeds, in an automated fashion to follow balked landing path 9. In addition, at any point subsequent to engaging automated approach system 35, the pilot may disengage the automated approach system 35.

In the instance that the OEI condition occurs after the aircraft 1 has passed through the LDP 5, the AFCS/FD 30 will continue along the flight path. In such an instance, at a pre-landing point 11 over the landing point 13, the AFCS/FD 30 activates an alert. In the event that the automated approach system 35 is aboard a helicopter, the alert indicate to the pilot the precise point for a final collective pull prior to landing. The pilot is required to perform this final collective pull due to the very abrupt and large magnitude collective input required in an OEI condition.

With respect to the deadman switch 31, once engaged by the pilot, a status signal indicative of the engagement is sent to the AFCS/FD 30. The status signal confirms that the pilot is monitoring the progress of the approach and can readily intervene in the event of a malfunction. When the deadman switch 31 is disengaged, a signal indicative of the change in status is communicated to AFCS/FD 30. If the deadman switch 31 is released during the approach to the LDP, the aircraft will execute an automated balked landing.

What is claimed is:

1. A method for automating a landing maneuver for an aircraft, comprising the steps of:

generating an approach profile comprising an initial approach fix (IAF), a flight path, a landing decision point, a pre-landing point, and a landing point;

engaging an automated approach system to access said approach profile;

receiving periodic position data of the aircraft;

comparing said position data to said approach profile to compute a plurality of deviations each time said position data is received;

outputting said plurality of deviations to a display;

converting said plurality of deviations into a plurality of control commands; and maneuvering said aircraft in response to said control commands along said flight path.

2. The method of claim 1 wherein said approach profile additionally comprises a balked landing route.

3. The method of claim 1 comprising the additional step of activating a deadman switch to output a pilot monitor status.

4. The method of claim 3 comprising the additional steps of:

sensing the occurrence of an engine failure; and responding to said occurrence of said engine failure by maneuvering said aircraft in response to said control commands along said balked landing route when said occurrence of said engine failure is sensed prior to said aircraft passing said landing decision point.

5. The method of claim 4 wherein said responding to said occurrence of said engine failure is initiated by a pilot command.

6. The method of claim 2 comprising the additional steps of:

sensing the occurrence of an engine failure; and responding to said occurrence of said engine failure by maneuvering said aircraft in response to said control commands along said flight path when said occurrence of said engine failure is sensed after said aircraft passing said landing decision point; and issuing an alert to perform a final collective pull.

7. The method of claim 2, wherein said generating said approach profile is performed by a flight management system.

8. The method of claim 2, wherein said receiving said position data is performed by a positioning system.

9. The method of claim 7, wherein said computing said plurality of deviation is performed by said flight management system.

10. The method of claim 2, wherein said converting said plurality of deviations into said plurality of control commands is performed by an automatic flight control system/flight director (AFCS/FD).

11. The method of claim 2, wherein generating the approach profile comprises the additional steps of:

inputting landing area positional data; and inputting inbound course data.

12. The method of claim 11 wherein said inbound course data is computed based upon wind data.

13. The method of claim 12 wherein said inputting said inbound course data is repeated in response to changes in said wind data.

14. The method of claim 2 wherein said display is a heads up display (HUD).

15. The method of claim 2 wherein said outputted plurality of deviations prompt auditory queues.

16. The method of claim 2 wherein said position data is received from at least one satellite.

17. The method of claim 2 wherein said position data is received from at least one ground station.

18. The method of claim 2 wherein said position data is received from an inertial positioning unit.

19. The method of claim 2 wherein said landing point is coincident with a raised heliport.

20. The method of claim 2 wherein said aircraft is a helicopter.

21. A system for enabling a landing maneuver comprising:

a positioning system for determining a position of an aircraft and outputting said position as position data;

a flight management system (FMS) capable of accessing or computing an approach profile, receiving as input said position data, comparing said position data to said approach profile to compute deviation data and outputting said deviation data;

a deadman switch capable of outputting a status signal;

an automatic flight control system/flight director (AFCS/FD) receiving as input said status signal and said deviation data and outputting control commands;

at least one trim servo for receiving said control commands and responding so as to alter the speed and direction of said aircraft; and a pilot display receiving as input said deviation data.

22. The system of claim 21 wherein said position data is received from at least one satellite.

23. The system of claim 21 wherein said position data is received from at least one ground station.

24. The system of claim 21 wherein said position data is received from an inertial positioning unit.

25. The system of claim 21 wherein said approach profile comprises an intial approach fix (IAF), a flight path, a landing decision point (LDP), a pre-landing point, and a landing point.

26. The system of claim 21 wherein said pilot display is a heads up display (HUD).

27. A method for simulating an automated a landing maneuver for an aircraft, comprising the steps of:

generating an approach profile comprising an initial approach fix (IAF), a flight path, a landing decision point, a pre-landing point, and a landing point;

engaging an automated approach system to access said approach profile;

receiving periodic simulated position data of the aircraft;

comparing said position data to said approach profile to compute a plurality of deviations each time said position data is received;

outputting said plurality of deviations to a display;

converting said plurality of deviations into a plurality of control commands; and configuring a display of a flight simulator in response to said control commands.

* * * * *